United States Patent [19]

Coon

[11] 3,814,173

[45] June 4, 1974

[54] CONTROL FOR FORCED AIR HEATING AND/OR COOLING SYSTEM

[76] Inventor: George M. Coon, Hillside House, Saybrook Rd., Essex, Conn. 06426

[22] Filed: June 27, 1973

[21] Appl. No.: 374,101

[52] U.S. Cl. .................... 165/12, 165/22, 165/122
[51] Int. Cl. ............................................. F24f 3/00
[58] Field of Search .................... 165/12, 22, 122

[56] References Cited
UNITED STATES PATENTS

| | | |
|---|---|---|
| 1,708,580 | 8/1929 | Kerlaquezo et al. ................ 165/22 |
| 3,482,623 | 12/1969 | Betz ...................................... 165/22 |
| 3,602,427 | 8/1971 | Joesting .............................. 165/22 |

*Primary Examiner*—Charles Sukalo
*Attorney, Agent, or Firm*—Oltman & Flynn

[57] ABSTRACT

In a forced air heating/cooling system having several individual room thermostats which fully open or fully close the air dampers, the thermostats are interrogated individually in succession to determine how many are demanding heated or cooled air. The forced air fan speed is set automatically in accordance with the total of such demand signals. As each thermostat is satisfied, this demand total is reduced accordingly to lower the fan speed.

21 Claims, 4 Drawing Figures

CONTROL FOR FORCED AIR HEATING AND/OR COOLING SYSTEM

BACKGROUND OF THE INVENTION

Conventional forced-air heating or cooling systems, or combined heating/cooling systems, have one or more air ducts leading to each room or zone in a building, such as a home or a commercial building. The register at the end of each duct usually has a damper that is manually adjustable to open and close the duct, either fully or partially to any desired extent. The ducts preferably are sized to provide the desired flow rate and pressure of the heated or cooled air, so as to provide the correct temperature distribution in all rooms. The dampers may be set initially to provide the desired balance throughout the system.

Usually only a single thermostat is provided for regulating the temperature in all rooms. However, in actual practice, the desired temperature regulation often is achieved only in the immediate vicinity of the thermostat. Elsewhere in the system, the temperature may vary considerably from room to room, depending upon the time of day, the season of the year, the room exposure to the outside, and other variables. This problem may be aggravated by the fact that the occupant of a room may have closed the room register to lower the temperature there, which tends to unbalance the system.

To overcome these problems various arrangements have been proposed heretofore in which each room or other area in a building is temperature-regulated by its own individual thermostat and the total volume of heated or cooled air is supposed to be regulated more or less in accordance with the total demand from all the rooms. In general, such prior systems have been relatively complex and sensitive, relying on temperature-sensing or pressure-sensing devices to provide what are essentially analog controls for the heated or cooled air delivered to the individual rooms, and overall system stability has been difficult to achieve and maintain.

SUMMARY OF THE INVENTION

The present invention is directed to a novel and improved control arrangement for a forced air heating and/or cooling system having different zones (such as rooms) that are to be heated and/or cooled under the control of individual zone thermostats.

The present invention has the various control functions provided in response to electrical signals which are digital in nature, thereby contributing to the stability and reliability of the system. The air fan associated with the furnace or cooling coils has its speed changed by digital increments in response to the total demand for heated air or cooled air, as sensed by the individual zone thermostats. In most instances, each thermostat, when interrogated, produced just a single demand signal (if heated or cooled air is required in the zone it controls). The fan speed is determined by the accumulated total of such demand signals extent at any particular time. One or more thermostats, however, may control a room or zone that is substantially larger than the others, in which case it may produce two demand signals when interrogated, so that the accumulated total of the demand signals will more accurately reflect the actual requirements of the system. The thermostats are interrogated individually in succession under the control of a program timer to determine the total demand for heated or cooled air at that time. Whenever a thermostat is so interrogated and indicates a demand for heated or cooled air, the damper in the corresponding forced air duct is opened fully. Whenever the temperature in this zone reaches the level called for by its thermostat, the damper is closed fully, and also the accumulated demand total which controls the fan speed is reduced accordingly by one or more no-demand signals.

It is a principal object of this invention to provide a novel and improved control arrangement for a forced air heating system, or cooling system, or a combined heating/cooling system, which has different zones, such as rooms, controlled by individual thermostats.

Another object of this invention is to provide such a control arrangement in which the speed of the fan which forces air through the system is controlled in response to the accumulated total of demand signals initiated by the different individual thermostats.

Another object of this invention is to provide such a control arrangement in which the damper for each zone is either fully open or fully closed, depending upon whether or not its thermostat is calling for a temperature change, and the speed of the fan which forces air through the system is responsive to the present accumulated total of demand signals from the several thermostats.

Another object of this invention is to provide such an arrangement in which all of the control functions are performed by solid state, electronic or electromechanical devices of proven reliability.

Further objects and advantages of this invention will be apparent from the following detailed description of a presently-preferred embodiment thereof, which is shown in the accompanying drawings, in which.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

The present control arrangement is described first in association with a forced-air heating system for a building, such as a family residence, which has a plurality of rooms, each with its own hot air duct provided with a damper, a single furnace for heating all the rooms, and a variable speed fan for forcing hot air through the ducts. The furnace preferably has a gas burner or an electric heater. In this heating system, each room has its own individual thermostat, which controls the opening and closing of the damper in the hot air duct leading to that room. The furnace, the fan, the hot air ducts and the dampers are not illustrated in the accompanying drawings since the details of these elements are not important to an understanding of the present invention.

THERMOSTAT-OPERATED HEATING CONTROL CIRCUIT FOR ONE ROOM

Figure 1:
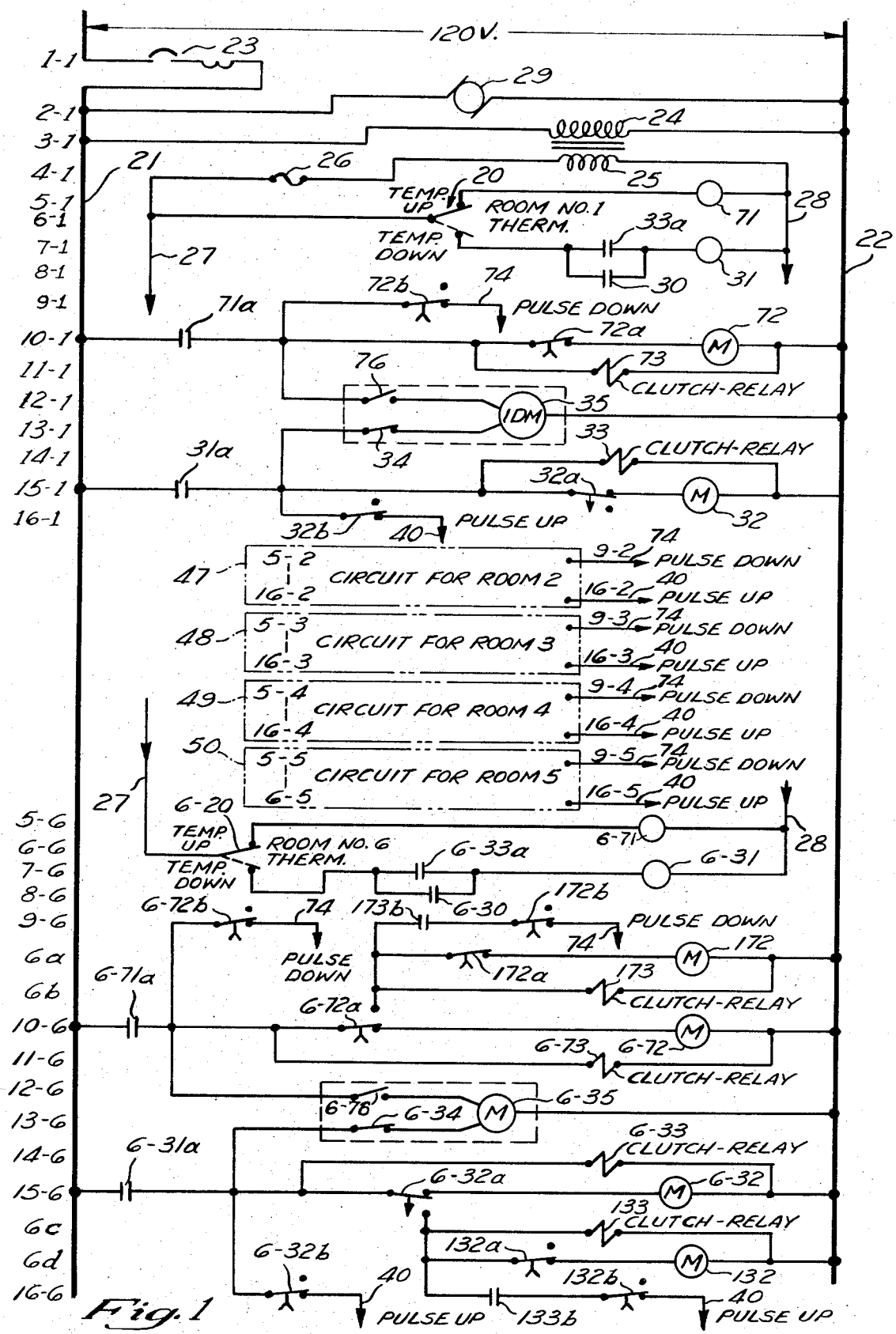
FIG. 1 is a schematic circuit diagram showing the control circuits operated by individual room thermostats in a forced air heating and/or cooling system.

Referring first to FIG. 1, the contacts 20 of the thermostat for one room in the building to be heated are shown in line 6 - 1. These thermostat contacts are connected in a 24-volt portion of an A.C. power supply which also has 120 volt lines 21 and 22. The 120 volt, 60 Hz power source is connected across lines 21, 22 through a circuit breaker 23 (line 1 — 1 in FIG. 1). When this circuit breaker is closed, the 120 volt power source is connected across the primary winding 24 of a step-down transformer (line 3 - 1). This transformer has a secondary winding 25 (line 4 - 1) which is connected through a fuse 26 across the 24 volt power lines 27 and 28.

When the circuit breaker is closed, a timer motor 29 (line 2 - 1) is energized by the 120 volt power lines 21 and 22. Associated with this timer motor are a series of normally-open contacts which are closed individually in succession, one at a time, and each of which is associated with an individual room thermostat.

Figure 3:
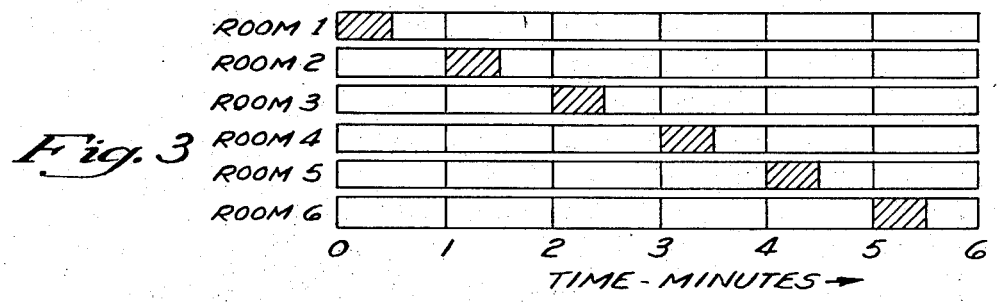
FIG. 3 is a timing diagram for the interrogation of different room thermostats in succession to determine, as to each, whether heated air or cooled air is required for its room.

FIG. 3 illustrates the timing sequence in one practical embodiment. The timer contacts associated with the room No. 1 thermostat 20 are closed for ½ minute and are open for 5½ minutes during each 6-minute interval that the timing motor 29 may be on. This is true for each set of timer contacts associated individually with the thermostats for rooms 2, 3, 4, 5 and 6, respectively. There is a ½ minute interval between the opening of the timer contacts for any room thermostat and the closing of the timer contacts for the next room thermostat in the sequence, as is evident from the timing chart. The timing motor 29 may be started, beginning the 6-minute total interval, at any place on the timing chart. For example, the timer contacts for the room No. 3 thermostat may be the first ones to close when the timing motor 29 comes on.

For purposes of this discussion, however, it will be assumed that the timer contacts for the room No. 1 thermostat are the first to close when the timer motor 29 comes on. These timer contacts are designated by the reference numeral 30 in line 8 - 1 of FIG. 1. When these timer contacts close, in effect the room No. 1 thermostat is now interrogated as to whether or not it is demanding heat for that room.

Assuming that the room No. 1 thermostat is demanding heat, its contacts 20 (line 6 - 1) will be in the "temperature down" (dotted line) position in FIG. 1, and when the timer contacts 30 close they complete an initial energization circuit for a room thermostat relay coil 31 (line 7 - 1) across the 24 volt power lines 27 and 28.

When this relay coil 31 is energized, it closes a set of normally-open contacts 31a (line 15 - 1) to complete an energization circuit for the motor 32 in a timing relay through a normally-closed set of contacts 32a in this timing relay. Also, a combined clutch and relay coil 33 in this timing relay (line 14 - 1) becomes energized when relay contacts 31a close. In one practical embodiment the motor 32, coil 33 and the relay contacts associated with them are embodied in a "BR2 reset timer," described in "Bulletin 1145" of Eagle Signal division of Gulf and Western Industries, Inc., Davenport, Iowa.

The closing of relay contacts 31a in line 15 - 1 completes an energization circuit through a now-closed limit switch 34 (line 13 - 1) for an actuator 35 which operates the damper in the air duct for room 1. This damper actuator now opens this damper. Also, when this damper is fully open, limit switch 34 is opened, thus deenergizing the damper actuator. When the damper was partly open, limit switch 76 closed, thus establishing a circuit for energizing the damper actuator to close the damper when relay contacts 71a (line 10 - 1) close, as described hereinafter.

The coil 33 in the timing relay, when energized, as described, immediately closes a normally-open set of contacts 33a (line 7 - 1) to complete a holding circuit for maintaining relay coil 31 energized following the opening of the contacts 30 by the timer motor 29 (30 seconds after they were closed by motor 29).

The energization of clutch-relay coil 33 also clutches the motor 32 to a rotary timing shaft which, after predetermined time delays, open the normally-closed contacts 32b (line 16 - 1) and opens the normally-closed contacts 32a (line 15 - 1). In one practical embodiment, the timing relay contacts 32b open about ½ second after coil 33 is energized, and the contacts 32a open a few milliseconds later.

However, before the timing relay contacts 32b are opened, the closing of the relay contacts 31a (line 15 - 1) will have completed a circuit through contacts 32b to a "pulse up" line 40.

FURNACE AND FAN CONTROL

Figure 2:
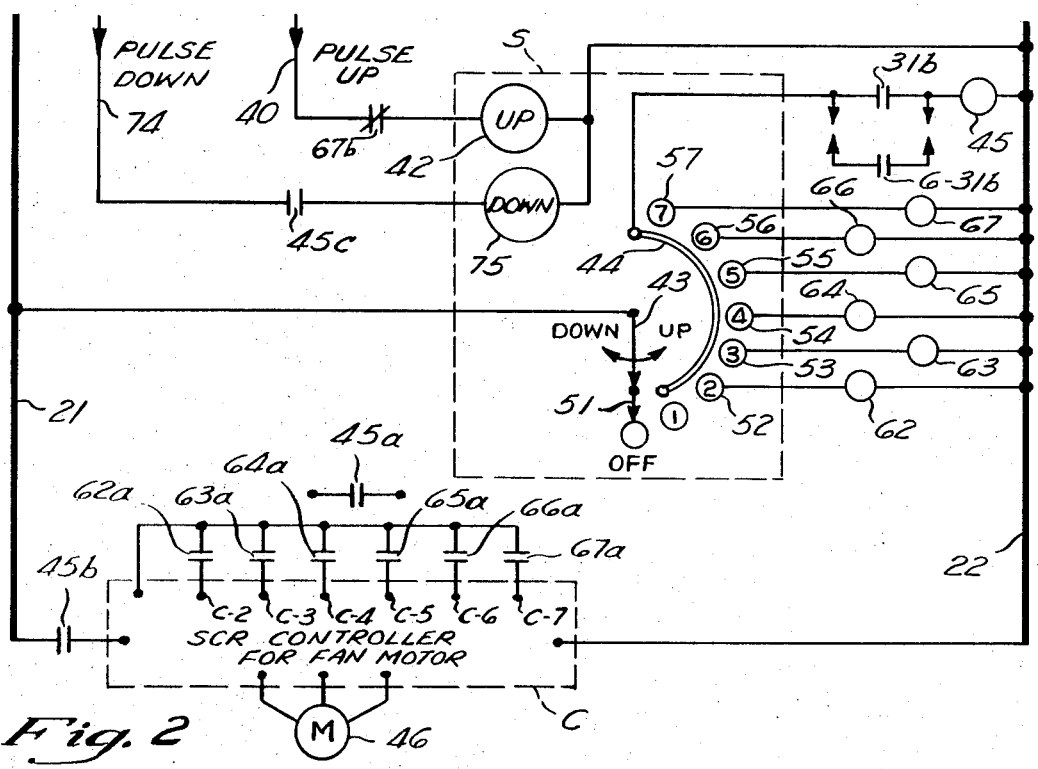
FIG. 2 is a schematic circuit diagram showing a bidirectional stepping relay for storing the accumulated total of demand signals from the room thermostats and setting the furnace fan speed accordingly.

Referring to FIG. 2, line 40 is connected through a normally-closed set of error-correcting relay contacts 67b to the "up" coil 42 of a bidirectional stepping relay, designated in its entirety by the dashed-line enclosure S in FIG. 2. In one practical embodiment this stepping relay may be on "add and subtract stepper," Model No. IR-PAS-120AC, manufactured and sold by Guardian Electric Mfg. Co., Chicago, Illinois.

Each time the "up" coil 42 receives a pulse over line 40 it moves the mobile switch contact (or "selector wiper") 43 in the stepping relay S a single increment counterclockwise in FIG. 2. For example, if this switch contact had been at the open-circuited "off" (6 o'clock) position, as shown, the energization of the "up" coil 42 causes it to move up to the "1" position. The next energization of relay coil 42 causes the mobile switch contact 43 to move up another single increment from the "1" position to the "2" position, and so on.

An elongated fixed contact 44 in the bidirectional stepping relay extends arcuately from the "1" position up to the "7" position, so as to be engaged by the mobile switch contact 43 throughout this entire range of the latter's positions. This elongated fixed contact 44 is connected through a normally-open set of relay contacts 31b (operated by relay coil 31 in line 7 - 1 of FIG. 1) to the coil 45 of a relay which controls the turning on of the furnace (whether gas or electric) and the fan for passing heated air from the furnace to the various room heating ducts. The relay contacts 31b were closed by the energization of relay coil 31, as described, so that the first "up" pulse received by relay coil 42 over line 40 causes the furnace-fan relay coil 45 to be energized.

The relay coil 45, when energized, closes a normally-open set of contacts 45a for turning on the gas burner or electric heater of the furnace (not shown).

Also, the relay coil 45, when energized, closes another normally-open set of contacts 45b connected between the 120 volt power supply line 21 and one side of an SCR controller C for the furnace fan motor 46 so as to turn on the fan. This SCR controller C has a speed setting potentiometer with a plurality of taps enabling different segments of its total resistance to be shorted out, so as to increase accordingly the input voltage to the fan motor 46, thus increasing the speed of the motor. These taps are shown at $c2$, $c3$, $c4$, $c5$, $c6$ and $c7$ in FIG. 2. In one practical embodiment this SCR controller C may be a "Min Pak" V*S drive manufactured and sold by Reliance Electric Company, Cleveland, Ohio.

From FIG. 2 it will be apparent that relay coil 45 may be energized whenever the mobile contact 43 in the reversible stepping relay is at any one of positions 1 through 7, provided the remainder of the circuit to relay coil 45 is closed, either through contacts 31b or through corresponding relay contacts associated individually with the other room thermostats. In FIG. 2, only the contacts 6 - 31b, operated by a relay coil 6 - 31 (line 6 — 6 of FIG. 1) connected to the room No. 6 thermostat are shown in parallel with contacts 31b. However, it is to be understood that each of the other room thermostat relays also has a set of normally-open contacts in parallel with the contacts 31b in FIG. 2.

Note that the energization of relay coil 45 in FIG. 2 (by the closing of relay contacts 31b) was dependent upon the room No. 1 thermostat relay coil 31 (line 7 - 1 of FIG. 1) having been energized. Such energization of relay coil 31 also had insured the opening of the damper for room No. 1 by the damper actuator 35 having been energized through relay contacts 31a in line 15 - 1. Consequently, the furnace heater and the fan would not have turned on, as described, if the damper for room No. 1 was not open. This is a safety factor to prevent overheating in the event that all of the room dampers are closed.

The single pulse which energized the stepping relay "up" coil 42 was of only momentary duration because the relay contacts 32b (line 16 - 1 of FIG. 1) are opened automatically by the timing relay motor 32 about one-half second after the clutch in this relay is engaged.

A few milliseconds after the relay contacts 32b open, the relay contacts 32a (line 15 - 1) also open, thereby de-energizing the timing relay motor 32. Note, however, that the clutch-relay coil 33 remains energized after motor 32 stops, thus keeping contacts 33a (line 7 - 1) closed and also deeping contacts 32a (line 15 - 1) and contacts 32b (line 16 - 1) held open by the timing shaft that is still clutched to motor 32.

After ½ minute has elapsed following the closing of the circuit breaker 23 (line 1 - 1), the program timer motor 29 opens the timer contacts 30 for relay coil 31. However, relay coil 31 remains energized through the relay contacts 33a as long as the thermostat switch 20 for room No. 1 remains in the dashed-line position and the clutch-relay coil 33 remains energized.

IDENTICAL CONTROL CIRCUITS FOR OTHER ROOMS

After another ½ minute interval (i.e., one full minute after the circuit breaker 23 is closed) the program timer motor 29 closes timer contacts associated with the room No. 2 thermostat (not shown). These timer contacts correspond to the room No. 1 thermostat timer contacts 30 in line 8 - 1, and the entire circuit for the room No. 2 thermostat is a duplicate of the just-described circuit (lines 5 - 1 through 16 - 1 of FIG. 1) for the room No. 1 thermostat. The room No. 2 thermostat circuit is designated in its entirety by the dashed-line enclosure 47 in FIG. 7 and is considered unnecessary to describe in detail because it is identical to the just-described room No. 1 thermostat circuit.

If the room No. 2 thermostat is calling for heat, a single momentary output pulse will be delivered by circuit 47 to the line 40 leading to the bidirectional stepping relay "up" coil 42 (FIG. 2). If not, then no output pulse from the room No. 2 thermostat circuit 47 will be applied to the "up" coil 42.

Each of the thermostats for rooms No. 3, 4 and 5 has associated with it an electrical circuit identical to that shown in lines 5 - 1 through 16 - 1 for the room No. 1 thermostat. These circuits are designated schematically at 48, 49 and 50 in FIG. 1.

If any of these room thermostats is calling for heat, when interrogated at subsequent intervals of the program timer, the associated circuit 48, 49 or 50 will produce a single momentary output pulse on line 40 to energize the "up" coil 42 in stepping relay S.

The program timer motor 29, in effect, interrogates the thermostat-operated circuits 47 - 50 for rooms No. 2, 3, 4 and 5 in succession, one at a time, to determine which ones are demanding heat for their respective rooms. Each one that is demanding heat delivers a single "up" pulse to the bidirectional stepping relay S, so that the mobile contact 43 is stepped up to a position corresponding to the number of "up" pulses that the stepping relay has received during the program.

The stepping relay S has an additional mobile contact 51 that moves in unison with contact 43 and is engagable in succession with fixed contacts 52, 53, 54, 55, 56 and 57. The coils 62, 63, 64, 65, 66 and 67 of corresponding fan motor speed control relays are connected respectively between these fixed contacts and the 120 volt power line 22. These relay coils operate respective normally-open contacts 62a, 63a, 64a, 65a, 66a and 67a, which are connected to the respective potentiometer taps $c2$, $c3$, $c4$, $c5$, $c6$ and $c7$ in the SCR controller C for the fan motor.

With this arrangement, when the stepping relay S has received two "up" pulses on line 40, so that its mobile contact 51 has been stepped up into engagement with fixed contact 52, this completes an energization circuit for the speed control relay coil 62, and the latter's contacts 62a close to short out part of the potentiometer resistance in the SCR controller C. Consequently, the fan motor speeds up to a second speed level, higher than the speed level after just the first "up" pulse had been received.

Each additional "up" pulse (one for each room thermostat that is demanding heat) moves the stepping relay contact 51 up an additional increment and speeds up the fan motor an additional predetermined increment.

Preferably, the incremental increases in the furnace fan speed (which occur as additional room thermostats call for heat, causing successive segments of the potentiometer resistance controller C to be shorted out) are such that the air pressure in the hot air ducts whose dampers are open is kept substantially constant. That is, each time another damper is opened the fan speed increases enough to maintain the same air pressure in the previously-opened ducts, as well as to establish this air pressure in the duct that has just been opened.

CONTROL CIRCUIT FOR OVERSIZED ROOM

For purposes of this discussion, room No. 6 is assumed to be about twice as large as each of rooms No. 1 through 5. Consequently, when the program timer gets around to interrogating the room No. 6 thermostat, if that thermostat demands heat for its room the present control arrangement has provision for causing the fan motor speed to increase by two increments (and not just one) because of the larger size of the room whose thermostat now calls for heat.

Lines 5 – 6 through 16 – 6 of FIG. 1 show the components of the room No. 6 thermostat circuit which are identical to those in the room No. 1 circuit, which has already been described in detail. Therefore, the detailed description of these circuit components will be omitted as unnecessarily repetitive, and it is to be understood that this portion of the room No. 6 circuit operates the same as the room No. 1 circuit. Elements in the room No. 6 circuit wich correspond to those in the room No. 1 circuit are given the same reference numerals, with a "6" prefix.

The room No. 6 thermostat circuit has additional lines 6a, 6b, 6c and 6d.

Referring to lines 6c and 6d of FIG. 1, a timing relay having a motor 132 and a clutch-relay coil 133 operates similar to the already-described timing relay which has motor 32 and coil 33 (lines 13 - 1 and 14 - 1) and is associated with the room No. 1 thermostat.

The coil 133 of this timing relay is connected across the 120 volt power lines 21 and 22 through the normally-open relay contacts 6 – 31a (line 15 - 6), which are operated by the room No. 6 thermostat relay coil 6 – 31 (line 6 — 6), and the normally-open contacts 6 – 32a, operated by the timing relay motor 6 – 32.

The timing relay motor 132 is connected in series with a normally-closed set of contacts 132a across the clutch-relay coil 133.

When the normally-closed timing relay contacts 6 – 32a (line 15 - 6) are opened and the normally-open contacts 6 – 32a are closed (which occurs about ½ second after the energization of clutch relay coil 6 – 33), the timing relay motor 132 is energized through the normally-closed contacts 132a, and the coil 133 of this timing relay also is energized. Such energization of coil 133 closes a set of normally-open contacts 133b (line 16 - 6), so that a second "up" pulse is delivered through these contacts 133b and a normally-closed set of timing relay contacts 132b to the line 40 leading to the "up" coil 42 in the bidirectional stepping relay S in FIG. 2.

With coil 133 energized, the timing motor 132 is clutched to a timing shaft which opens the contacts 132b about ½ second after coil 133 is energized, and then opens contacts 132a a few milliseconds later. This de-energizes motor 132, but coil 133 remains energized to maintain its contacts 133b closed and to maintain contacts 132b and 132a held open.

With this arrangement, when the room No. 6 thermostat is interrogated and it demands heat, two "up" pulses are delivered in succession via line 40 to the bidirectional stepping relay S. Both of these pulses occur during the ½ minute interval that the thermostat relay coil 6 – 31 (lines 7 - 6) remains energized.

The program timer motor 29 continues to run as long as circuit breaker 23 remains closed so that the different room thermostats are interrogated in succession repeatedly.

SYSTEM RESPONSE AS ROOMS REACH TEMPERATURES SET BY THERMOSTATS

In the present system, the fan speed is reduced each time any individual room thermostat indicates that its room has reached the temperature for which that thermostat has been set. Also, the damper controlled by that thermostat is closed.

Taking room No. 1 as an example, when the temperature there reaches the thermostat setting, its switch contacts 20 (line 6 - 1) will move up to the full-line position. Consequently, relay coil 31 (line 7 - 1) will be de-energized, causing its contacts 31a (line 15 - 1) to open and de-energize the coil 33 (line 14 - 1) of the timing relay. Also, relay coil 71 (line 5 - 1) now becomes energized, and it closes the normally-open relay contacts 71a in line 10 - 1. The motor 72 and the clutch-relay coil 73 of a timing relay become energized in response to such closing of contacts 71a. This timing relay is identical to the timing relay having motor 32 and coil 33.

When thus energized, coil 73 causes motor 72 to become clutched to a rotary timing shaft in the timing relay so as to open the normally-closed timing relay contacts 72b (line 9 - 1) about ½ second after coil 73 is energized and then to open the normally-closed timing relay contacts 72a (line 10 - 1) a few milleseconds later to de-energize motor 72.

However, during this ½ second interval while the timing relay contacts 72b still remain closed, a single momentary "no-demand" pulse is delivered over line 74 to the "down" coil 75 in stepping relay S (FIG. 2) through the now-closed contacts 45c operated by relay coil 45. When so energized, the "down" coil 75 causes the mobile contacts 43, 51 of the stepping relay to move down a single increment, thereby decreasing the fan speed by a single increment to compensate for the fact that room No. 1 no longer requires heat.

In addition to decreasing the fan speed, the energization of the relay coil 71 in the room No. 1 thermostat control circuit causes the damper in the heat duct for room No. 1 to be closed. When this duct was fully opened, it closed a normally-open limit switch 76 (lines 12 - 1), so now when the relay contacts 71a (line 10 - 1) close, the damper actuator 35 is energized to close this damper. Essentially the same circuitry is provided in association with the room thermostat for each of rooms 2, 3, 4 and 5. Consequently, whenever the thermostat in any of these rooms senses that the desired temperature has been reached in that room, a single "down" pulse is delivered over line 74 to reduce the fan speed by a single increment and the damper is closed in the heating duct for that room.

In the case of room No. 6, two "down" pulses are delivered so as to reduce the fan speed by two increments, and the damper in this room's heat duct also is closed.

The first "down" pulse is produced in response to the room No. 6 thermostat through the operation of a timing relay having a motor 6 – 72 (line 10 - 6), a clutch-relay coil 6 - 73 (line 11 - 6), and contacts 6 – 72a (line 10 - 6) and 6 – 72b (line 9 - 6), which correspond functionally to the similarly numbered (but without the prefix "6") elements in the room No. 1 thermostat circuit.

The second "down" pulse from the room No. 6 thermostat circuit is produced in response to the operation of a timing relay having a motor 172 (line 6a), a clutch-relay coil 173 (line 6b), and contacts 172a, 172b and 173b, which correspond generally to the elements 132, 133, 132a, 132b and 133b in lines 6c, 6d and 16 - 6, except that they produce a second "down" pulse on line 74, instead of a second "up" pulse.

The "down" pulses on line 74 for reducing the fan speed incrementally may occur in any sequence from the different room thermostats, depending upon the order in which the different rooms reach the desired temperatures. As a practical matter, there is virtually no possibility that two different room thermostats would signal this condition simultaneously, so that their combined effect might produce just a single "down" pulse on line 74, instead of two. Therefore, in the preferred embodiment of this system, the different room thermostats are not interrogated individually in succession as to whether the desired room temperature has been reached, but instead the system is arranged so that, in effect, all the thermostats are being so interrogated continuously. This is advantageous in that each damper can be closed immediately whenever the temperature in its room reaches the desired level.

If the temperature outside the building rises to a point where no heat is required for any of the rooms the mobile contacts 43, 51 in the stepping relay S will be at the "off" position because none of the room thermostats will be demanding heat. Under such circumstances, relay coil 45 will be de-energized, the furnace heater will be off, and the fan motor will be de-energized.

Whenever the outside temperature falls to a value such that any of the room thermostats calls for heat, the system will function automatically in the manner already described in detail.

STEPPING RELAY ERROR CORRECTION

If for any reason the position of the mobile contacts 43, 51 in the stepping relay S (FIG. 2) does not accurately reflect the number of thermostats calling for heat (counting two for the room No. 6 thermostat), the present control has provision for automatically correcting such an error when these contacts are at either extreme position (7 or "off").

For example, if the mobile contacts in the stepping relay are at position 7 before one remaining room thermostat demands heat, when that thermostat actually does demand heat the "up" pulse which it delivers over line 40 will be blocked from the "up" relay coil 42 because the normally-closed contacts 67b will have been opened by the energization of relay coil 67 when the mobile contact 51 previously reached the 7 position. Consequently, the mobile contacts 43, 51 will remain at what is now the correct position (7).

Conversely, if the mobile contact 43 in the stepping relay S is at the "off" position but one room damper is actually open because its thermostat is demanding heat, relay coil 45 will be de-energized and contacts 45c will be open. Then, if the thermostat for the room which has the open damper delivers a "down" pulse over line 74 because the correct heat has been reached in that room, this pulse will have no effect because the open contacts 45c will prevent it from energizing the "down" coil 75. Consequently, the stepping relay S now correctly reflects the fact that none of the room thermostats is calling for heat.

COOLING

The present control arrangement may, by slight additions, be adapted for use with a thermostat-controlled combined heating and cooling system having the necessary cooling coils and compressor. When the system is used for cooling, the room damper must be open when the thermostat for that room senses the actual room temperature as being higher than what the thermostat is set for. When that room temperature has been lowered to the desired value, the damper should be closed.

For cooling, higher fan speeds should be employed to compensate for the greater density of cooled air as compared with heated air.

Figure 4:
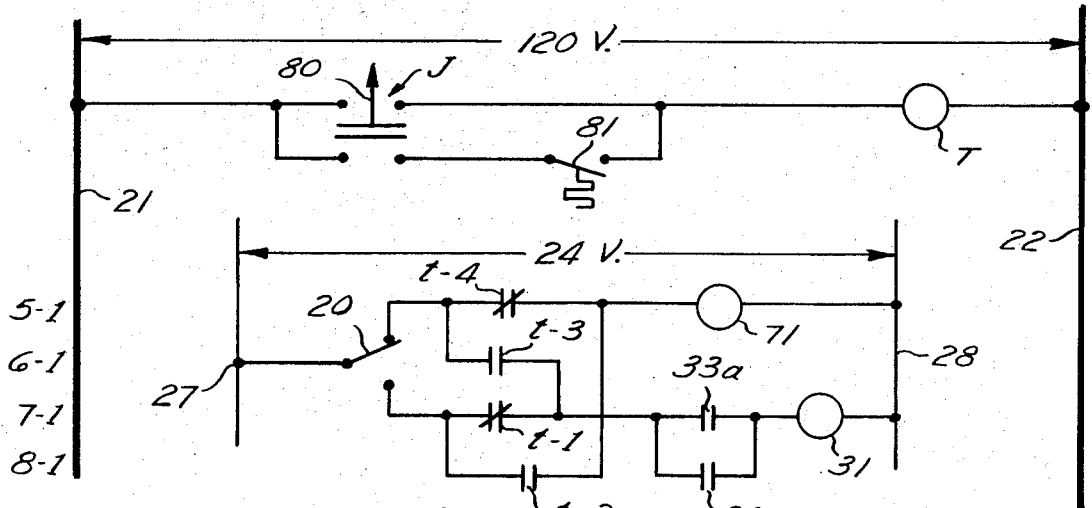
FIG. 4 is a fragmentary circuit diagram showing a transfer relay arrangement operable by a switch to convert from the heating mode to the cooling mode, or vice versa.

FIG. 4 shows the modifications made in line 5 - 1 through 8 - 1 of FIG. 1 to adapt the room No. 1 control circuit for cooling as well as heating. Similar modifications are made in the control circuits associated with each of the other individual room thermostats.

In line 7 - 1 of FIG. 4, a normally-closed set of transfer relay contacts $t$-1 is connected in series between the "down" contacts of the room No. 1 thermostat switch 20 and the timer relay contacts 33a and relay coil 31.

In line 8 - 1 of FIG. 4, a normally-open set of transfer relay contacts $t$-2 is connected in series between the "down" contacts of thermostat switch 20 and relay coil 71.

In line 6 - 1 of FIG. 4, a normally-open set of transfer relay contacts $t$-3 is connected in series between the "up" contacts of thermostat switch 20 and the timer relay contacts 33a and relay coil 31.

In line 5 - 1 of FIG. 4, a normally-closed set of transfer relay contacts $t$-4 is connected in series between the "up" contacts of thermostat switch 20 and relay coil 71.

These transfer relay contacts $t$-1, $t$-2, $t$-3 and $t$-4 are under the control of the transfer relay coil T, which is connected across the 120 volt power lines 21 and 22 through a switch J at the thermostat that may be operated either manually or automatically. This switch has a mobile contact carrier 80 that may be set to any one of three different positions. In the middle position (shown in FIG. 4), this contact carrier maintains the transfer relay coil T de-energized, so that the control circuit associated with each room thermostat will operate in the heating mode only, which has been described in detail already. When the contact carrier 80 in switch J is in the "up" position in FIG. 4, it connects the transfer relay coil T across the power supply lines 21 and 22. When the contact carrier 80 in switch J is in the "down" position in FIG. 4, it connects the transfer relay coil T across the power supply lines 21 and 22 through a switch 81 that responds to the temperature outside the building by closing when the outside temperature rises.

With this arrangement, when the switch J is set for the heating mode, the transfer relay coil T will be de-energized, its normally-closed contacts $t$-1 and $t$-4 will be closed, and the thermostat control circuit will function exactly as already described.

However, if the mobile contact carrier 80 of switch J is set "up" at the non-automatic cooling position, the transfer relay coil will be energized, opening its contacts *t*-1 and *t*-4 and closing its contacts *t*-2 and *t*-3. Consequently, relay coil 31 will be energized when the thermostat switch 20 is in its "up" position, indicating that the room temperature is above what the thermostat is set for. Also, relay coil 71 will be de-energized while the thermostat switch 20 is in its "up" position. Conversely, when the thermostat switch 20 is in its "down" position, relay coil 71 will be energized and relay coil 31 will be de-energized.

The same operation takes place if the mobile contact carrier 80 of switch J is set to its "down" position and the outside temperature switch 81 is closed.

I claim:

1. In a forced-air heating or cooling system having a plurality of room thermostats, a plurality of dampers which are automatically controlled individually by said thermostats to regulate the delivery of heated or cooled air to the corresponding rooms, heat exchange means for heating or cooling the air to be supplied to said dampers, and a variable speed fan for passing heated or cooled air from said heat exchange means to said dampers, the improvement which comprises:
   means for varying the speed of said fan in accordance with the total demand for heated or cooled air from said thermostats.

2. A system according to claim 1, wherein each damper is fully opened when the corresponding thermostat demands heated or cooled air and is fully closed when the corresponding thermostat does not demand heated or cooled air.

3. A system according to claim 1, wherein said last-mentioned means comprises:
   means for interrogating said thermostats individually in succession to provide corresponding demand signals if the interrogated thermostat senses the need for heated or cooled air;
   and means responsive to said demand signals to set the fan speed in accordance with the accumulated total of said demand signals.

4. A system according to claim 3, and further comprising means operable by at least one of the thermostats to produce more than one demand signal whenever said thermostat, when interrogated, senses the need for heated or cooled air there.

5. A system according to claim 3, and further comprising means responsive to each thermostat to produce a no-demand signal which reduces said total demand when that thermostat senses that the desired air temperature has been reached.

6. A system according to claim 5, wherein said means to set the fan speed comprises:
   bidirectional stepping means operated in one direction by said demand signals and operated in the reverse direction by said no-demand signals;
   and a motor controller operated by said stepping means to control the speed of the fan in accordance with the setting of said stepping means.

7. A system according to claim 3, wherein said means for interrogating the thermostats to provide demand signals comprises:
   a switch operated individually by each thermostat in accordance with whether the desired air temperature has been reached there;
   a relay operated by said switch when said thermostat is demanding heated or cooled air;
   and means responsive to the operation of said relay to
   a. open the damper for that thermostat's heating or cooling zone, and
   b. produce a demand signal for increasing the fan speed, and
   c. discontinue said demand signal after a brief time delay.

8. A system according to claim 7, and further comprising: an additional relay operated by said switch when said thermostat is not demanding heated or cooled air;
   and means responsive to the operation of said last-mentioned relay to
   a. close the damper for the thermostat's heating or cooling zone, and
   b. produce a signal for reducing said accumulated total of demand signals so as to reduce the fan speed accordingly, and
   c. discontinue said last-mentioned signal after a brief time delay.

9. A system according to claim 8, and further comprising means operable by at least one of the thermostats to produce more than one demand signal or no-demand signal in accordance with whether said thermostat senses the need for heated or cooled air there.

10. In a forced-air heating or cooling system having a plurality of room thermostats, a plurality of dampers which are automatically controlled individually by said thermostats to regulate the delivery of heated or cooled air to the corresponding rooms, heat exchange means for heating or cooling the air to be supplied to said dampers, and a variable speed fan for passing heated or cooled air from said heat exchange means to said dampers, the improvement which comprises:
    means for producing demand signals from those thermostats which demand heated or cooled air;
    and electrically operable means for controlling the fan speed in accordance with the accumulated total of said demand signals.

11. A system according to claim 10, wherein said last-mentioned means comprises reversible stepping means for totalling said demand signals, and an electrical controller operated by said stepping means and controlling the speed of the fan motor.

12. A system according to claim 10, wherein said means for producing demand signals from the thermostats includes means providing time separation of the demand signals from the different thermostats.

13. A system according to claim 12, and further comprising means operable by each thermostat to produce a signal, whenever that thermostat does not demand heated or cooled air, for reducing said accumulated total of demand signals.

14. In a forced-air heating or cooling system having a plurality of discrete area thermostats, separate ducts leading to the different discrete areas to be heated or cooled, a damper for each duct movable between fully-open and fully-closed positions under the control of the corresponding thermostat, and means for varying the flow rate of heated or cooled air delivered to said ducts the improvement which comprises:

means for interrogating the thermostats individually in succession and for controlling said flow rate varying means to deliver heated or cooled air in accordance with the present total demand of all the thermostats.

15. A system according to claim 14, wherein said last-mentioned means comprises:

timing means for causing the thermostats to be interrogated individually in succession to provide corresponding demand signals according to whether or not each interrogated thermostat demands heated or cooled air;

and means for accumulating the total of said demand signals and for regulating the flow rate of heated or cooled air delivered to the ducts in accordance with said accumulated total.

16. In a forced-air heating or cooling system having a plurality of room thermostats, separate forced-air ducts for the different rooms, a damper for each duct movable under the control of the corresponding thermostat between fully-open and fully-closed positions, and a variable speed fan for passing heated or cooled air to the ducts, the improvement which comprises:

a controller for setting the fan speed at any of several discrete selected values;

electrically operated means for operating said controller digitally;

binary switch means operated by each thermostat to provide either a deman signal or a no-demand signal, in accordance with whether the air temperature at that thermostat is at the value set by that thermostat;

and relay means operated by each binary switch means to produce digital signals for operating said electrically operated means digitally.

17. A system according to claim 16, wherein said electrically operated means is a bidirectional relay which is stepped a single increment in one direction in response to each demand signal and is stepped a single increment in the opposite direction in response to each no-demand signal.

18. A system according to claim 17, and further comprising means for correcting said bidirectional stepping relay to eliminate possible errors therein when it is at either extreme operating position.

19. A system according to claim 16, wherein said relay means operated by at least one of said thermostat-operated binary switch means produces more than one demand signal when that thermostat is calling for a temperature change and produces the same number of no-demand signals when the air temperature at that thermostat reaches the value for which it is set.

20. A system according to claim 16, wherein said relay means comprises, for each thermostat, a corresponding first relay operated by the respective binary switch means to produce a demand signal when that thermostat calls for a temperature change and a corresponding second relay operated by the respective binary switch means to produce a no-demand signal when that thermostat is satisfied, and further comprising program timer means for enabling said first relays individually in succession to be operated by the respective thermostat-operated binary switch means to provide corresponding demand signals, and means for enabling all of said second relays continuously to be operated by the respective thermostat-operated binary switch means to provide corresponding no-demand signals.

21. A system according to claim 6, wherein said stepping means has "up" stepping means for stepping it in said one direction and "down" stepping means for stepping it in said opposite direction, and further comprising a set of normally-closed contracts in series with said "up" stepping means, means for opening said normally-closed contacts when said stepping means reaches a predetermined value in said one direction, a set of normally-open contacts in series with said "down" stepping means, and means for closing said normally-open contacts when said stepping means reaches a predetermined value in said opposite direction.

* * * * *